US011353568B2

(12) United States Patent
Matsuura et al.

(10) Patent No.: US 11,353,568 B2
(45) Date of Patent: Jun. 7, 2022

(54) ULTRASONIC OBJECT DETECTION DEVICE

(71) Applicant: DENSO CORPORATION, Kariya (JP)

(72) Inventors: Mitsuyasu Matsuura, Nisshin (JP); Taketo Harada, Nisshin (JP); Kenji Fukabori, Kariya (JP)

(73) Assignee: DENSO CORPORATION, Kariya (JP)

( * ) Notice: Subject to any disclaimer, the term of this patent is extended or adjusted under 35 U.S.C. 154(b) by 105 days.

(21) Appl. No.: 16/737,074

(22) Filed: Jan. 8, 2020

(65) Prior Publication Data

US 2020/0142044 A1 May 7, 2020

Related U.S. Application Data

(63) Continuation of application No. PCT/JP2018/020859, filed on May 30, 2018.

(30) Foreign Application Priority Data

Jul. 10, 2017 (JP) .............................. JP2017-134856

(51) Int. Cl.
*G01S 7/527* (2006.01)
*G01S 15/931* (2020.01)

(52) U.S. Cl.
CPC ............ *G01S 7/527* (2013.01); *G01S 15/931* (2013.01)

(58) Field of Classification Search
None
See application file for complete search history.

(56) References Cited

U.S. PATENT DOCUMENTS

| 5,103,427 A * | 4/1992 | Erdol ................ G01S 7/52046 367/11 |
| 5,183,048 A * | 2/1993 | Eberle ................... A61B 8/12 600/447 |
| 5,277,065 A * | 1/1994 | Leszczynski ....... G01F 23/2962 367/903 |
| 7,957,223 B2 * | 6/2011 | Hafer ................. G01F 23/2962 367/99 |

(Continued)

FOREIGN PATENT DOCUMENTS

| JP | 63-311192 A | 12/1988 |
| JP | 2001-133549 A | 5/2001 |

(Continued)

*Primary Examiner* — Isam A Alsomiri
*Assistant Examiner* — Vikas Atmakuri
(74) *Attorney, Agent, or Firm* — Maschoff Brennan

(57) ABSTRACT

An object detector includes: an acquiring unit that acquires an oscillation signal corresponding to an oscillation of a microphone, the microphone transmitting a transmission wave, which is an ultrasonic wave, on a basis of a driving signal, and being caused to oscillate by a reflected wave generated as a result of the transmission wave being reflected from an object; a fall identifying unit that identifies a fall time point of a first drop from a value more than a threshold to the threshold or less after termination of the driving signal; a rise estimating unit that estimates a rise-in-reverberation time point of the reflected wave, the rise-in-reverberation time point being before the fall time point and after a time point of start of the driving signal; and a distance determining unit that determines a distance to the object on a basis of the rise-in-reverberation time point.

4 Claims, 5 Drawing Sheets

(56) References Cited

U.S. PATENT DOCUMENTS

| | | | | |
|---|---|---|---|---|
| 2008/0291784 | A1* | 11/2008 | Yamanaka | G01L 9/0025 |
| | | | | 367/99 |
| 2011/0087342 | A1* | 4/2011 | Liao | G01S 15/101 |
| | | | | 700/32 |
| 2011/0122729 | A1* | 5/2011 | Hu | G01S 15/04 |
| | | | | 367/98 |
| 2013/0235700 | A1* | 9/2013 | Koudar | G01S 7/52026 |
| | | | | 367/99 |
| 2014/0204700 | A1* | 7/2014 | Valero | G06F 17/14 |
| | | | | 367/7 |
| 2015/0292879 | A1* | 10/2015 | Zhou | G01B 17/00 |
| | | | | 73/631 |
| 2016/0107194 | A1* | 4/2016 | Panchawagh | G01S 7/5208 |
| | | | | 367/140 |
| 2016/0238700 | A1* | 8/2016 | Matsuura | G01S 15/931 |
| 2017/0123055 | A1* | 5/2017 | Hustava | G01S 15/18 |
| 2017/0227640 | A1* | 8/2017 | Nomura | G01S 7/526 |
| 2017/0322304 | A1* | 11/2017 | Matsuura | G01S 15/02 |
| 2018/0156916 | A1* | 6/2018 | Nomura | G01S 7/529 |
| 2019/0079187 | A1* | 3/2019 | Tsuji | G01S 7/52 |

FOREIGN PATENT DOCUMENTS

| | | |
|---|---|---|
| JP | 2002-090452 A | 3/2002 |
| JP | 2016-031354 A | 3/2016 |
| JP | 2016-080397 A | 5/2016 |
| WO | WO-2016063527 A1 * 4/2016 | G01S 7/527 |

* cited by examiner

ULTRASONIC OBJECT DETECTION DEVICE

CROSS-REFERENCE TO RELATED APPLICATION

The present application is a continuation application of International Application No. PCT/JP2018/020859, filed May 30, 2018, which claims priority to Japanese Patent Application No. 2017-134856, filed Jul. 10, 2017. The contents of these applications are incorporated herein by reference in their entirety.

BACKGROUND

1. Technical Field

The disclosure relates to an ultrasonic object detector.

2. Related Art

A transmission/reception ultrasonic object detector has been known. In such a type of object detector, an oscillator having transmitted a transmission wave, which is an ultrasonic wave, receives a reflected wave. In driving the oscillator for transmission of the transmission wave, reverberation occurs in the oscillator after termination of driving. The energy of the reverberation is considerably larger than the energy of the reflected wave. Accordingly, a device for detecting an object at a distance short enough for the reflected wave and the reverberation to overlap is required.

SUMMARY

The present disclosure provides an object detector. One mode of the present disclosure is an object detector provided with an acquiring unit, a fall identifying unit, a rise estimating unit and a distance determining unit. The acquiring unit acquires an oscillation signal corresponding to an oscillation of a microphone, the microphone transmitting a transmission wave, which is an ultrasonic wave, on a basis of a driving signal, and being caused to oscillate by a reflected wave generated as a result of the transmission wave being reflected from an object. The fall identifying unit identifies a fall time point of a first drop from a value more than a threshold to the threshold or less after termination of the driving signal. The rise estimating unit estimates a rise-in-reverberation time point of the reflected wave, the rise-in-reverberation time point being before the fall time point and after a time point of start of the driving signal. The distance determining unit determines a distance to the object on a basis of the rise-in-reverberation time point.

BRIEF DESCRIPTION OF THE DRAWINGS

In the accompanying drawings.

DETAILED DESCRIPTION OF THE PREFERRED EMBODIMENTS

Figure 1:
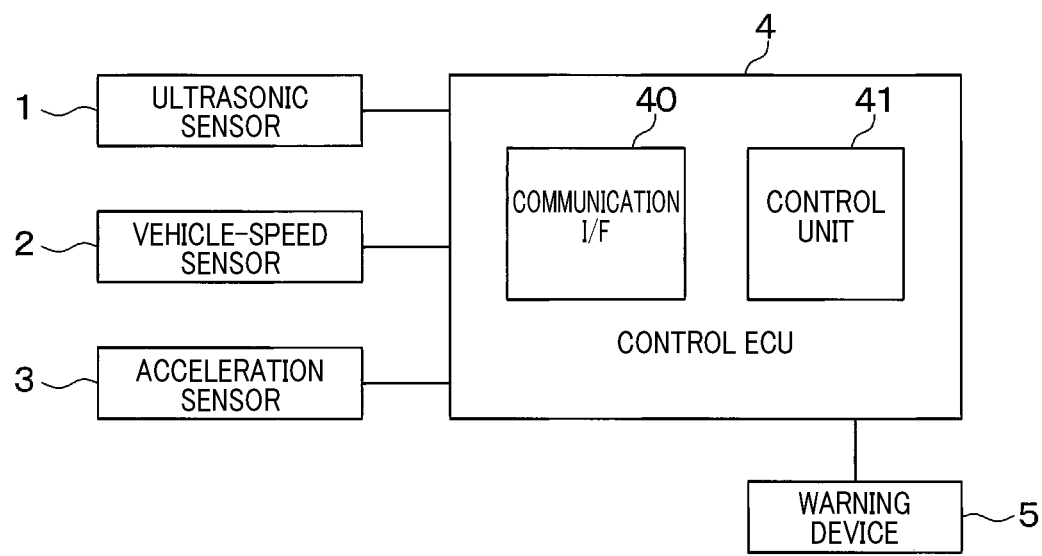
FIG. 1 is a configuration diagram of a vehicle object detector according to a first embodiment.

The inventors of the present disclosure have studied the following technique to detect a distance to an object with use of a reflected wave if the reflected wave overlaps reverberation.

For example, according to a technology disclosed in JP2002-090452A (hereinafter referred to as "PTL 1"), an object is determined to be present at a short distance as a plurality of reflected waves are assumed to be reached from a single object by multipath reflection on the basis of detecting second and subsequent reflected waves with equal perception of distance as a result of overlap between reverberation and a reflected wave.

However, according to studies by the inventors, the technology as disclosed in PTL 1 allows for detecting a distance to an object only in a case where an object detector can receive a plurality of reflected waves by multipath reflection. An example of the case where the object detector receives a plurality of reflected waves by multipath reflection is a case where a transmission wave is reflected on a flattened object with a large area, such as a wall. However, the object detector may not receive a plurality of reflected waves by multipath reflection depending on a shape of an object. For example, a transmission wave may be reflected from an object in the shape of a thin pole, such as a road sign pole.

An object of the disclosure is to detect a distance to an object with use of a reflected wave if the reflected wave overlaps reverberation.

According to an aspect of the disclosure, an object detector includes: an acquiring unit configured to acquire an oscillation signal corresponding to an oscillation of a microphone, the microphone being configured to transmit a transmission wave, which is an ultrasonic wave, by being driven to oscillate on a basis of a driving signal, while being caused to oscillate by receiving a reflected wave generated as a result of the transmission wave being reflected from an object; a fall identifying unit configured to identify, in a variation with time of an amplitude of the oscillation signal acquired by the acquiring unit, a fall time point of a first drop from a value more than a threshold to the threshold or less after termination of the driving signal; a rise estimating unit configured to estimate a rise-in-reverberation time point of the reflected wave on a basis of the fall time point identified by the fall identifying unit, the rise-in-reverberation time point being before the fall time point and after a time point of start of the driving signal; and a distance determining unit configured to determine a distance to the object on a basis of the rise-in-reverberation time point estimated by the rise estimating unit.

If the reverberation and the reflected wave overlap, the object detector estimates the rise-in-reverberation time point of the reflected wave on the basis of the fall time point of the first drop from the value more than the threshold to the threshold or less after termination of the driving signal. The rise-in-reverberation time point is the time point before the fall time point and after the time point of start of the driving signal. Thus, it is possible to detect the distance to the object with use of the reflected wave even if the reverberation and the reflected wave overlap.

It should be noted that reference signs in parentheses provided to components, or the like, each represent an example of a correspondence relationship between the component or the like and a specific component or the like described in a later-described embodiment.

The object mentioned above, and other objects, features, and advantages of the present disclosure shall be made clearer from the following detailed description with reference to the accompanying drawings.

First Embodiment

A first embodiment will be described below. As illustrated in FIG. 1, a vehicle object detector according to the first embodiment, which is equipped in a vehicle, includes an ultrasonic sensor 1, a vehicle-speed sensor 2, an acceleration sensor 3, a control ECU 4, and a warning device 5.

For example, the ultrasonic sensor 1 is located at a left end of a bumper of a front end portion of the vehicle, a right end of the bumper of the front end portion of the vehicle, a left end of a bumper of a rear end portion of the vehicle, or a right end of the bumper of the rear end portion of the vehicle. The ultrasonic sensor 1 is able to detect an obstacle in a region around the vehicle.

Figure 2:
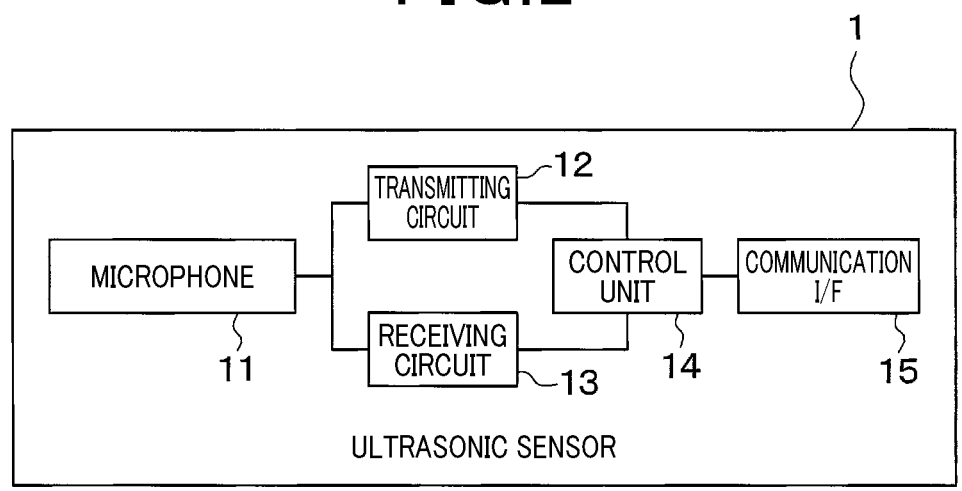
FIG. 2 is a configuration diagram of an ultrasonic sensor.

The ultrasonic sensor 1 includes a microphone 11, a transmitting circuit 12, a receiving circuit 13, a control unit 14, a communication interface 15 as illustrated in FIG. 2.

The microphone 11 is driven to oscillate by a driving signal applied from the transmitting circuit 12. The driving signal is an electrical signal that varies at a resonance frequency of the microphone 11 or a frequency near the resonance frequency. For example, the driving signal is a rectangular pulse signal.

The microphone 11 is driven to oscillate by the driving signal, generating a transmission wave, which is an ultrasonic wave, and transmitting the transmission wave to surroundings of the vehicle. In addition, the microphone 11 keeps on oscillating for a while after a time point of termination of the application of the driving signal from the transmitting circuit 12. The oscillation of the microphone 11 that occurs after termination of the application of the driving signal is referred to as reverberation.

If the microphone 11 is driven during the transmission of the transmission wave, reverberation occurs in the microphone 11 after termination of the application of the driving signal. An energy of the reverberation is considerably larger than an energy of the reflected wave. In other words, the amplitude of the reverberation is considerably larger than the amplitude of the reflected wave. Accordingly, a device for detecting an object at a distance short enough for the reflected wave and the reverberation to overlap is required.

In addition, the microphone 11 receives a reflected wave, which is an ultrasonic wave, generated as a result of the transmission wave being reflected from an object such as a wall, thus being caused to oscillate by the received reflected wave. When caused to be oscillated by receiving the reflected wave, the microphone 11 converts the reflected wave to an electrical signal and outputs the electrical signal to the receiving circuit 13.

The microphone 11 may include an oscillator and a driving circuit. In this case, the oscillator may be a piezoelectric oscillator with a sintered compact including piezoelectric ceramics such as PZT or barium titanate. The driving circuit applies a voltage corresponding to the driving signal applied from the transmitting circuit 12 to the oscillator, thereby causing the oscillator to oscillate as described above.

The transmitting circuit 12 generates the above driving signal in response to input of a transmission instruction signal from the control unit 14 and applies the driving signal to the microphone 11. The microphone 11 is driven to oscillate by the driving signal, thereby transmitting a transmission wave with the same frequency as that of the driving signal to the surroundings of the vehicle.

The receiving circuit 13 amplifies the electrical signal inputted from the microphone 11 and outputs an amplified signal (hereinafter, referred to as oscillation signal) to the control unit 14. The oscillation signal is a signal corresponding to the oscillation of the microphone.

The control unit 14 is a microcomputer including CPU, RAM, ROM, and flash memory. The RAM, ROM, and flash memory are each a non-transitory computer-readable storage medium.

The control unit 14 controls an operation of the microphone 11 via the transmitting circuit 12 on the basis of a transmission command from the control ECU 4, thereby causing the microphone 11 to transmit the transmission wave. In addition, the control unit 14 calculates, for example, a distance to an object in accordance with the oscillation signal received from the receiving circuit 13 and transmits a calculation result as detection information to the control ECU 4. Details of a process of the control unit 14 will be described later.

The communication interface 15 mediates communication between the control unit 14 and the warning device 5. Specifically, the communication interface 15 mediates transmission of the transmission command from the control ECU 4 to the control unit 14 and transmission of the detection information from the control unit 14 to the control ECU 4.

The vehicle-speed sensor 2 is a known sensor that outputs a vehicle-speed pulse signal with a frequency corresponding to a rotational speed of wheels of the vehicle as a detection signal. The acceleration sensor 3 is a known sensor that outputs a detection signal corresponding to an acceleration on a vehicle body. The control ECU 4 includes a communication interface 40 and a control unit 41 as illustrated in FIG. 1. The communication interface 40 is an interface circuit for communication with the communication interface 15 of the ultrasonic sensor 1.

The control unit 41 is a microcomputer including CPU, RAM, ROM, and flash memory. The RAM, ROM, and flash memory are each a non-transitory computer-readable storage medium.

The warning device 5, which is controlled by the control ECU 4, warns a person in an interior of the vehicle with use of either one of an image or sound or both.

Description will be given below of a process implemented by the control unit 14 of the ultrasonic sensor 1 and a process implemented by the control ECU 4. The control unit 41 executes a predetermined program, thereby causing the control ECU 4 to repeatedly perform a process illustrated in FIG. 3 at regular intervals. Meanwhile, the control unit 14 of the ultrasonic sensor 1 executes a predetermined program, thereby performing a process illustrated in FIG. 4.

Figure 3:
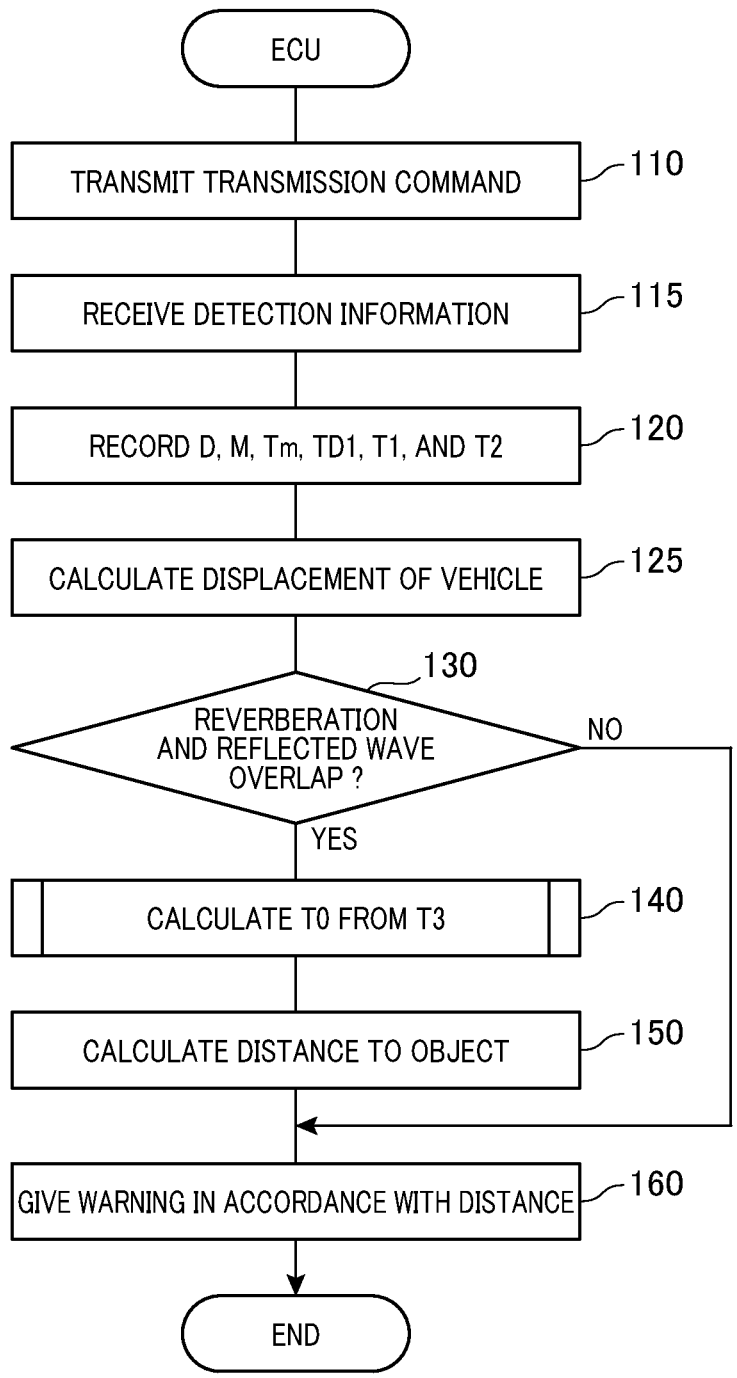
FIG. 3 is a flowchart of a process performed by a control ECU.
Figure 4:
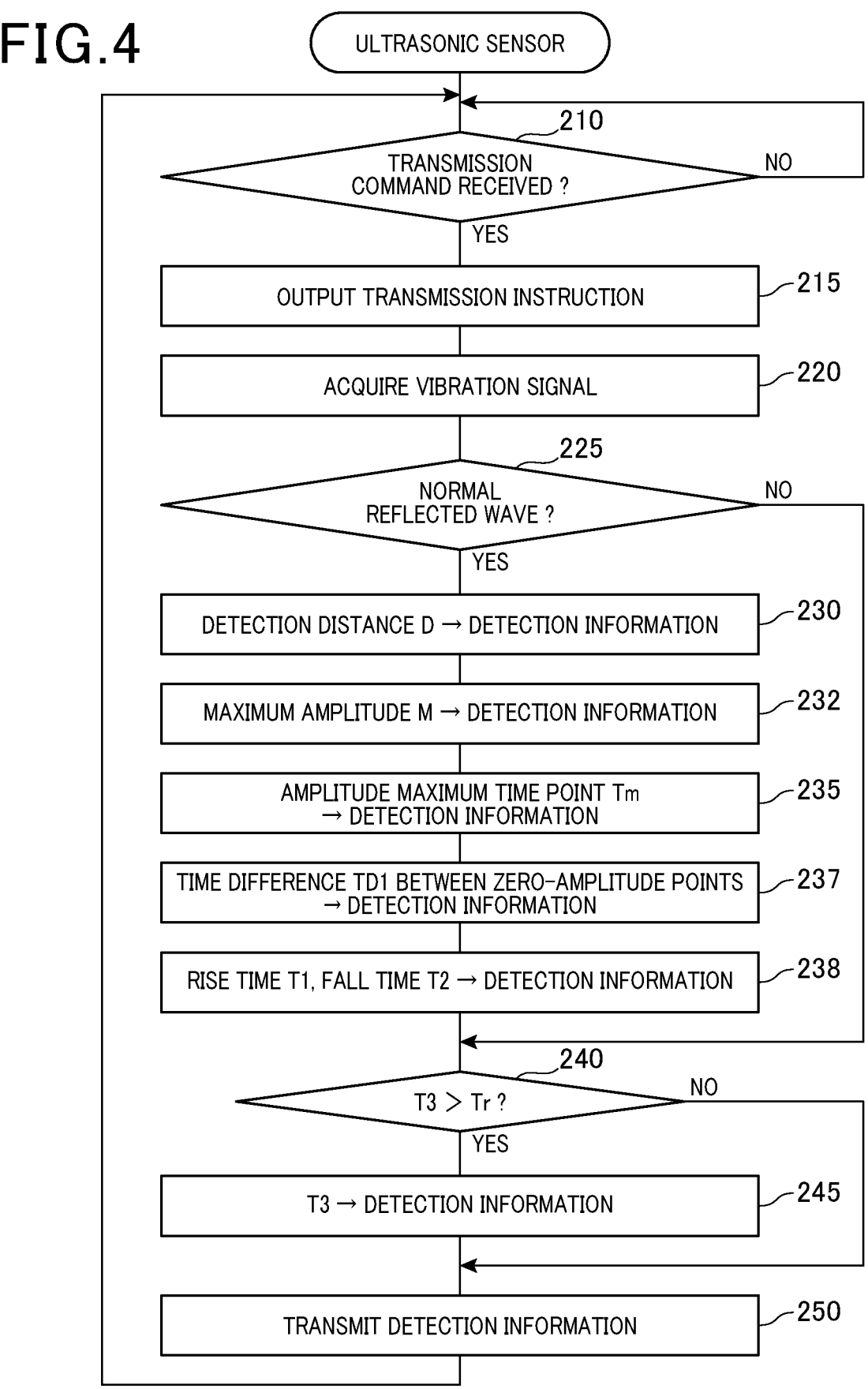
FIG. 4 is a flowchart of a process performed by a control unit of the ultrasonic sensor.

In Step 110 of the process of FIG. 3, the control ECU 4 transmits the transmission command to the ultrasonic sensor 1.

The control unit 14 of the ultrasonic sensor 1 first determines whether the transmission command has been received from the control ECU 4 in Step 210. If not received, Step 210 is repeated. Meanwhile, if received, the process proceeds to Step 215. Thus, the control unit 14 repeats Step 205 while no transmission command has been received. When the control unit 14 acquires the transmission command from the ultrasonic sensor 1 during repetition of Step 205, the process proceeds from Step 210 to Step 215.

In Step 215, the control unit 14 outputs the transmission instruction signal to the transmitting circuit 12 for a predetermined period. This causes the transmitting circuit 12 to generate the driving signal and output the driving signal to the microphone 11 for the predetermined period. The microphone 11 is driven to oscillate by the driving signal, transmitting the transmission wave with the same frequency as that of the driving signal. The transmission wave strikes an object (e.g., obstacle) around the vehicle, thus being reflected to generate the reflected wave. When the reflected wave reaches the microphone 11, the microphone 11 is caused to oscillate.

At this time, the receiving circuit 13 outputs an oscillation signal corresponding to the oscillation of the microphone 11 to the control unit 14. The oscillation signal corresponds to the oscillation of the microphone 11 driven by the driving signal, the oscillation of the microphone 11 corresponding to the reverberation caused after termination of the driving signal, and the oscillation of the microphone caused by reception of the reflected wave.

As the process proceeds to Step 215 to Step 220, the control unit 14 acquires the oscillation signal from the receiving circuit 13 only for a predetermined standby period from an output start point of the transmission instruction signal. An amount given by multiplying a half of this standby period by the speed of sound corresponds to a maximum detectable distance of the ultrasonic sensor 1.

Subsequently, in Step 225, the control unit 14 determines whether a normal reflected wave has been received on the basis of the acquired oscillation signal. The normal reflected wave means a reflected wave not overlapping reverberation. To determine whether a normal reflected wave has been received, it is determined whether an amplitude of the oscillation signal acquired in the current iteration of Step 220, has changed from a value lower than a sensor output threshold X to a value higher than the sensor output threshold X during a detection period illustrated in FIG. 5.

Figure 5:
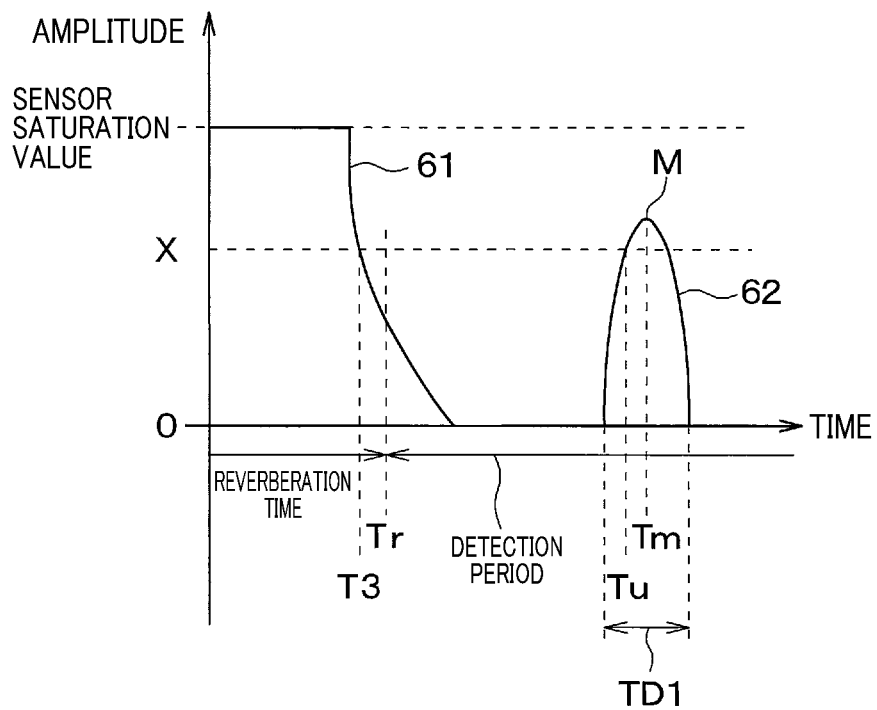
FIG. 5 is a graph that illustrates an amplitude of an oscillation signal resulting from reception of a normal reflected wave.

A solid line in FIG. 5 is a graph that illustrates an amplitude of the oscillation signal resulting from reception of the normal reflected wave by the microphone 11. A solid line 61 represents an amplitude of the oscillation signal corresponding to the driving signal and the reverberation and a solid line 62 represents an amplitude of the oscillation signal corresponding to the reflected wave. A sensor saturation value in FIG. 5 is an amplitude maximum value detectable by the control unit 14. Even when a voltage higher than the sensor saturation value is applied from the receiving circuit 13 to the control unit 14, the control unit 14 detects the sensor saturation value as an amount corresponding to this voltage.

In this regard, a start point of the detection period is a reference time point Tr reached after the elapse of a predetermined reverberation time from the output start point of the transmission instruction signal as illustrated in FIG. 5. An end point of the detection period is a time point reached after the elapse of the above standby period from the output start point of the transmission instruction signal. The reverberation time is a time from the output start point of the transmission instruction signal to a time point when reverberation is highly unlikely to occur. The reverberation time may be fixedly determined in advance in accordance with characteristics of the microphone 11 or modified through a learning process.

If the control unit 14 determines that the normal reflected wave has been received in Step 225, the process proceeds to Step 230, otherwise the process skips Steps 230, 232, 235, 237, and 238 and proceeds to Step 240.

In Step 230, a detection distance D is calculated on the basis of a time difference between the output start point of the transmission instruction signal and a rise time point Tu of the reflected wave 62. The detection distance D is added to the detection information. The rise time point Tu of the reflected wave 62 is a time point when the amplitude of the oscillation signal changes from a value less than the sensor output threshold X to a value equal to or more than the sensor output threshold X during the detection period. The detection distance D, which is a distance from the microphone 11 to an object, is calculated by multiplying the half of the above time difference by the speed of sound.

Subsequently, in Step 232, the control unit 14 identifies a maximum amplitude M of the reflected wave 62 and adds the maximum amplitude M to the detection information. The maximum amplitude of the reflected wave 62 is a maximum value of the amplitude of the oscillation signal at a time point after the rise time point Tu of the reflected wave.

Subsequently, in Step 235, the control unit 14 identifies an amplitude maximum time point Tm, that is, a time point when the maximum amplitude M of the reflected wave 62, is reached, and adds the amplitude maximum time point Tm to the detection information.

Subsequently, in Step 237, the control unit 14 calculates a zero-point time interval TD1 and adds the zero-point time interval TD1 to the detection information. The zero-point time interval TD1 is a time interval from a time point when the amplitude of the reflected wave 62 starts to increase from zero to a time point when the amplitude of the reflected wave 62 drops to zero as illustrated in FIG. 5. The time point when the amplitude of the reflected wave 62 starts to increase from zero is a detection time point of a most recent amplitude of the oscillation signal before an amplitude of the oscillation signal corresponding to the reflected wave 62 detected as a value more than zero by the control unit 14 for the first time.

Subsequently, in Step 238, the control unit 14 calculates and adds a rise time T1 and a fall time T2 to the detection information. The rise time T1 is a time interval from the time point when the amplitude of the reflected wave 62 starts to increase to the amplitude maximum time point Tm. The fall time T2 is a time interval from the amplitude maximum time point Tm to the time point when the amplitude of the reflected wave 62 drops to zero. Subsequently to Step 238, the process of the control unit 14 proceeds to Step 240.

In Step 240, it is determined whether an early fall time point T3 is a time point after the above reference time point Tr. The early fall time point T3 is a time point of a first drop from a value more than the sensor output threshold X to the sensor output threshold or less in a variation with time of the amplitude of the oscillation signal, which is acquired in the current iteration of Step 220, after termination of the application of the driving signal.

Figure 6:
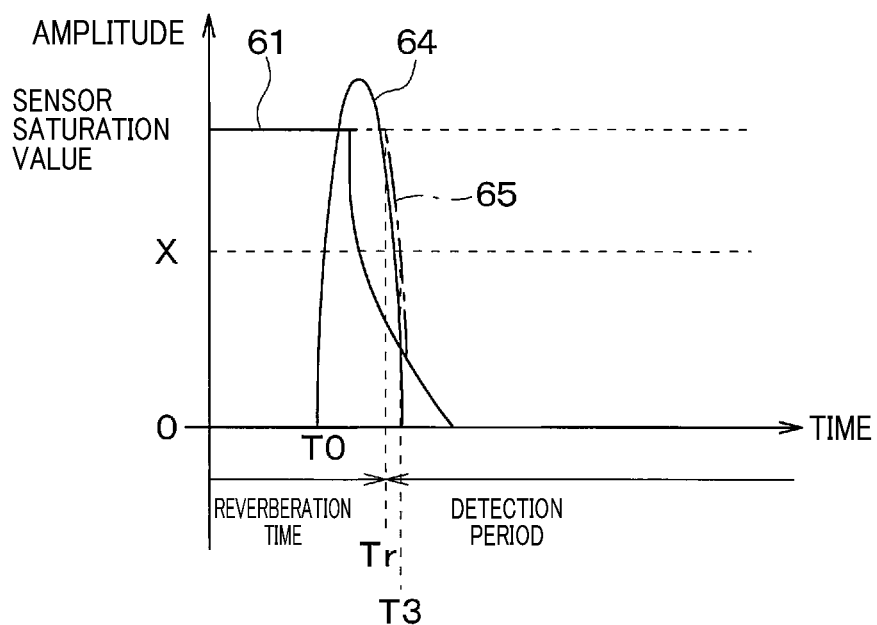
FIG. 6 is a graph that illustrates an amplitude of the oscillation signal resulting from reception of a reflected wave overlapping reverberation.

If the reflected wave does not overlap the reverberation, the early fall time point T3 is assumed to be before the above reference time point Tr as illustrated in FIG. 5. In contrast, if the reflected wave overlaps the reverberation, the early fall time point T3 is a time point after the above reference time point Tr as illustrated in FIG. 6. In FIG. 6, a combined wave of an oscillation 61 of the microphone 11 caused by the reverberation and an oscillation 64 of the microphone 11 caused by the reflected wave is detected as an oscillation signal 65 by the control unit 14.

If the early fall time point T3 is a time point after the reference time point Tr in Step 240, the process of the control unit 14 proceeds to Step 245, otherwise the process skips Step 245, proceeding to Step 250.

In Step 245, the early fall time point T3 is added to the detection information. Subsequently to Step 245, the process proceeds to Step 250.

In Step 250, the detection information is transmitted to the control ECU 4. If the normal reflected wave is determined to be received in Step 225 (e.g., the case exemplified in FIG. 5), the detection information includes the detection distance D, the maximum amplitude M, the amplitude maximum time point Tm, the zero-point time interval TD1, the rise time T1, and fall time T2. If the early fall time point T3 is determined to be after the reference time point Tr in Step 240 (e.g., the case exemplified in FIG. 6), the detection information includes the early fall time point T3.

Meanwhile, after transmitting the transmission command in Step 110, the control ECU 4 waits for the detection information to be received from the ultrasonic sensor 1 only for a predetermined period in Step 115. When the control ECU 4 receives the detection information, the process proceeds to Step 120.

In Step 120, if the detection information received in the current iteration of Step 115 includes the detection distance D, the maximum amplitude M, the amplitude maximum time point Tm, the zero-point time interval TD1, the rise time T1, and the fall time T2, these contents are recorded in the RAM of the control unit 41.

Subsequently, in Step 125, a displacement of the vehicle is calculated. Specifically, a displacement of the vehicle from a time point when the detection distance D, the maximum amplitude M, the amplitude maximum time point Tm, the zero-point time interval TD1, the rise time T1, and the fall time T2 were recorded in the control ECU 4 more recently among opportunities in the past for performing Step 120, excluding the current iteration of Step 120, is calculated on the basis of the detection signal outputted from each of the vehicle-speed sensor 2 and the acceleration sensor 3. The displacement includes a change in a location of the vehicle and a change in an attitude of the vehicle.

Subsequently, in Step 130, the control ECU 4 determines whether the reverberation and the reflected wave overlap. Determining whether the reverberation and the reflected wave overlap equates to determining whether a later-described rise-in-reverberation time point is to be assumed.

In more detail, if condition A and condition B are both satisfied, the control ECU 4 determines that the reverberation and the reflected wave overlap. If either one of the following condition A or condition B is not satisfied, the control ECU 4 determines that the reverberation and the reflected wave do not overlap. If the condition A is not satisfied and the condition B is not satisfied, the control ECU 4 determines that the reverberation and the reflected wave do not overlap.

The condition A is a condition requiring that the early fall time point T3 is recorded in the detection information received in the current iteration of Step 115. Thus, referring to Step 240, the condition A equates to a condition requiring that the early fall time point T3 is after the reference time point Tr.

It is determined whether the condition B is satisfied on the basis of a location of an object identified at a time point in the past and a displacement of the vehicle at and after the time point in the past. In this regard, the time point in the past is a time point when the detection distance D, the maximum amplitude M, the amplitude maximum time point Tm, the zero-point time interval TD1, the rise time T1, and the fall time T2 in the control ECU 4 were recorded more recently among the opportunities in the past for performing Step 120 excluding the current iteration of Step 120.

For example, description will be given of a case where the ultrasonic sensor 1 is located to transmit the transmission wave in a forward direction relative to the vehicle. It is assumed that the detection distance D to an object from the microphone 11 is recorded as 60 cm at the time point in the past. Moreover, in the most recent step, namely, Step 125, the control ECU 4 identifies a forward travel distance of the vehicle reached from the time point in the past as 40 cm.

In this case, in Step 130, the control ECU 4 determines whether the condition B is satisfied by determining whether a value given by subtracting the forward travel distance from the recorded detection distance D is equal to or less than a determination value (e.g., 25 cm). In this instance, the value given by subtracting the forward travel distance from the recorded detection distance D is 20 cm. Since this value is less than the determination value, the control ECU 4 determines that the condition B is satisfied. As is understandable from the above, the condition B is a condition requiring that the object detected in the past came closer to be at a predetermined distance or shorter as the vehicle traveled.

If the control ECU 4 determines that the reverberation and the reflected wave overlap, the process proceeds to Step 140. If the control ECU 4 determines that the reverberation and the reflected wave do not overlap, the process skips Steps 140 and 150, proceeding to Step 160.

In Step 140, a rise-in-reverberation time point T0 is calculated from the early fall time point T3. As illustrated in FIG. 6, if the oscillation 64 caused by the reflected wave solely overlaps the oscillation 61 caused by the reverberation, the rise-in-reverberation time point T0 is a time point when the amplitude of the oscillation 64 increases from zero. The rise-in-reverberation time point T0 is thus a time point before the above early fall time point T3 and after a time point of start of the driving signal.

Figure 7:
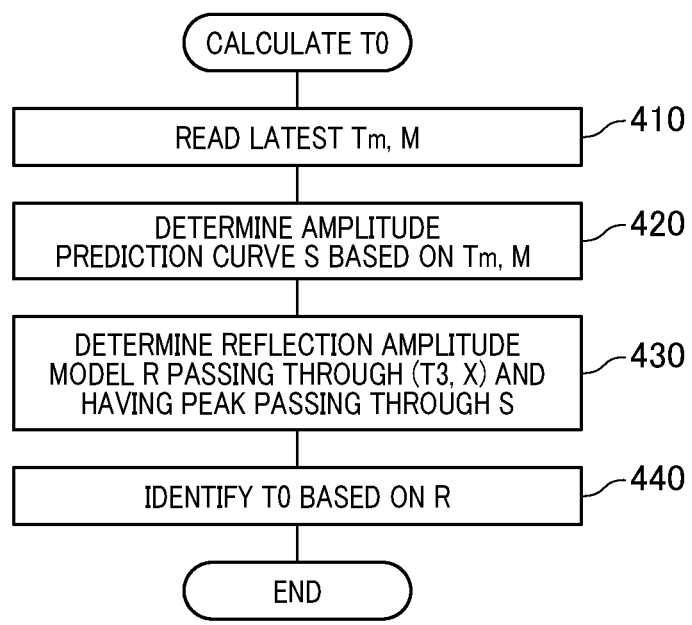
FIG. 7 is a flowchart of a rise point calculation process.

For a calculation process of the rise-in-reverberation time point T0, the control ECU 4 performs a process illustrated in FIG. 7. In Step 410 in the process of FIG. 7, the control ECU 4 first reads the maximum amplitude M and the amplitude maximum time point Tm in a most recent set among sets of the detection distance D, the maximum amplitude M, the amplitude maximum time point Tm, and the zero-point time interval TD1 recorded in the previous iteration of Step 120 from the RAM of the control unit 41. The most recent set is read because a reflected wave that provides the maximum amplitude M and the amplitude maximum time point Tm included in the most recent set and the reflected wave currently overlapping the reverberation are most likely to travel from the same object.

Figure 8:
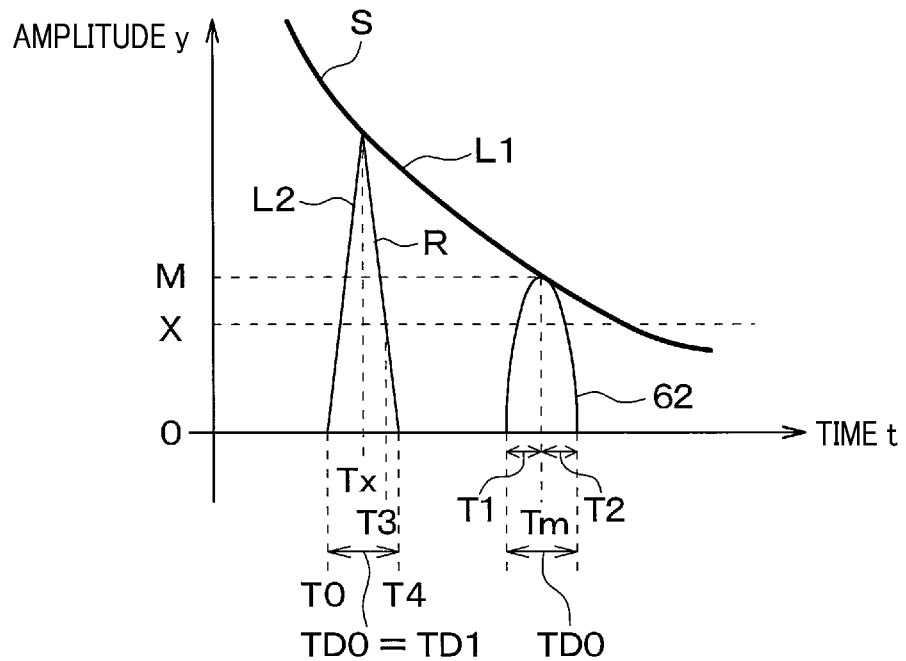
FIG. 8 is a graph that illustrates a relationship between a reflection amplitude model and rise-in-reverberation time point.

Subsequently, in Step 420, the control ECU 4 determines an amplitude prediction curve S on the basis of the maximum amplitude M and the amplitude maximum time point Tm read in the current iteration of Step 410 as illustrated in FIG. 8.

The amplitude prediction curve S is a curve representing a one-to-one relationship between time and amplitude. Assuming that the same single object may be present at a plurality of various distances from the microphone 11, the amplitude prediction curve S represents possible relationships between the maximum amplitude M and the amplitude maximum time point Tm of the reflected wave from this object.

t denotes a time elapsed from a time point when a transmission wave is outputted from the microphone 11 to a time point when the transmission wave is reflected by the object and returns as a reflected wave to the microphone 11. y denotes a maximum amplitude of the reflected wave. In this case, a relationship of $y=A \times t^{-2} \times \exp(-t \times m \times c/2)$ is established between t and y. In this expression, c denotes the speed of sound and m denotes an attenuation constant determined by temperature and humidity. A coefficient A is a positive number. The coefficient A is a constant value as long as the same object reflects the transmission wave and an orientation of a reflection surface relative to the microphone 11 is the same. For example, in a case where the vehicle travels straight forward or rearward while an object is still, the coefficient A for this object is constant. However, the values of the coefficient A are different among different objects. This is because different objects have different reflectances for an ultrasonic wave, etc.

Determining the amplitude prediction curve S equates to determining the value of the coefficient A. As illustrated in FIG. 8, by determining respective values of the maximum amplitude M and the amplitude maximum time point Tm, the value of the coefficient A allowing the amplitude prediction curve S to pass through a point (M, Tm) in a time-amplitude space. More specifically, M is assigned to y and t is assigned to Tm in the above relational expression, providing $A=M \times Tm^2 \times \exp(t \times m \times c/2)$.

It should be noted that respective values of the attenuation constant m and the speed of sound c are determined as follows. The control ECU 4 may calculate the attenuation constant m by identifying current temperature and humidity using known temperature sensor and humidity sensor and entering the temperature and the humidity in an attenuation conversion table recorded in advance in the ROM of the control ECU 4. In the attenuation conversion table, respective values of the attenuation constant m for a plurality of pairs of temperature and humidity are recorded. Alternatively, the control ECU 4 may calculate the attenuation constant m by identifying a current temperature using a known temperature sensor and entering the temperature and a fixed value of humidity (e.g., 60%) in the above attenuation conversion table.

Additionally, the control ECU 4 may calculate the speed of sound c by identifying a current temperature using a known temperature sensor and entering the temperature in a speed-of-sound conversion table recorded in advance in the ROM of the control ECU 4. In the speed-of-sound conversion table, respective values of the speed of sound c for a plurality of combinations are recorded.

Subsequently, in Step 430, the control ECU 4 determines a reflection amplitude model R that schematically represents a variation with time of the amplitude of the reflected wave overlapping the reverberation. It is not necessary for the reflection amplitude model R to reproduce the variation with time of the amplitude of the reflected wave overlapping the reverberation in detail. The reflection amplitude model R only has to reproduce the variation with time of the reflected wave sufficiently to accurately identify the later-described rise-in-reverberation time point T0.

Specifically, the reflection amplitude model R consists of the other two sides L1 and L2 of a triangle with a base that corresponds to a time axis with zero amplitude in the time-amplitude space illustrated in FIG. 8. As illustrated in FIG. 8, the reflection amplitude model R is determined in such a way as to satisfy the following conditions 1, 2, 3, and 4, that is, condition 1: the position (T3, X) in the time-amplitude space is passed through, condition 2: a peak where the amplitude is maximized lies on the amplitude prediction curve S, condition 3: a time difference TD0 between two points with zero amplitude is equal to the zero-point time interval TD1, and condition 4: a ratio between a time difference between one of the two points with zero amplitude (i.e., rise-in-reverberation time point T0) and a peak time point and a time difference between the other point T4 and a peak time point Tx is T1/T2.

In this regard, the peak time point Tx in the condition 4 is a time point when a peak representing the maximum amplitude is reached. Moreover, the two points T0 and T4 with zero amplitude are a time point T0 when the amplitude of the reflection amplitude model R starts to increase from zero and a time point T2 when the amplitude of the reflection amplitude model R drops to zero, respectively. The reflection amplitude model R that satisfies the conditions 1, 2, 3, and 4 is uniquely determined.

Subsequently, in Step 440, the control ECU 4 identifies the rise-in-reverberation time point T0 on the basis of the reflection amplitude model R determined in the current iteration of Step 430. Specifically, as illustrated in FIG. 8, a time point where earlier one of the two points with zero amplitude in the reflection amplitude model R lies in the time-amplitude space is identified as the rise-in-reverberation time point T0. After Step 440, the calculation process of the rise-in-reverberation time point T0 is completed.

Subsequently, in Step 150, a distance from the microphone 11 to the object is calculated on the basis of the rise-in-reverberation time point T0 calculated in the current iteration of Step 140. The distance is calculated by multiplying a half of a time elapsed from a time point when the transmission command is transmitted to the time point T0 by the speed of sound. Subsequently to Step 150, the process of the control ECU 4 proceeds to Step 160.

The control ECU 4 gives a warning in accordance with the distance in Step 160. Specifically, if the detection information received in the current iteration of Step 115 includes the detection distance D, the maximum amplitude M, the amplitude maximum time point Tm, and the zero-point time interval TD1 and Steps 140 and 150 are skipped, the control ECU 4 gives a warning with reference to the detection distance D. If the detection information received in the current iteration of Step 115 includes the early fall time point T3 and Steps 140 and 150 are skipped, the control ECU 4 gives a warning with reference to the distance identified in Step 150.

In more detail, the control ECU 4 determines which one of three distance ranges, i.e., as short distance, middle distance, and long distance, the reference distance corresponds to. For example, the reference distance corresponds to a short distance if the reference distance is less than a first distance threshold, corresponds to a middle distance if the reference distance is not less than first distance threshold and less than a second distance threshold, and corresponds to a long distance if the reference distance is not less than the second distance threshold. The first distance threshold and the second distance threshold may each be a fixed value or a value variable to provide hysteresis.

The control ECU 4 then gives a warning including a content corresponding to the identified distance range. For example, in a case where the warning device 5 is controlled to emit a warning sound at predetermined intervals, a length of the predetermined intervals is differentiated among the short distance, the middle distance, and the long distance. In more detail, a length of the predetermined intervals for the middle distance is longer than a length for the short distance and a length for the long distance is longer than the length for the middle distance. After Step 160, one iteration of the process of FIG. 3 is completed.

As described above, the control unit 14 of the ultrasonic sensor 1 identifies the early fall time point T3 in the variation with time of the amplitude of the oscillation signal corresponding to the oscillation of the microphone 11 in Step 245. The control ECU 4 then estimates the rise-in-reverberation time point T0 of the reflected wave on the basis of the early fall time point T3 in Step 140, the rise-in-reverberation time point T0 being before the early fall time point T3 and after the time point of start of the driving signal. The control ECU 4 then determines the distance to the object on the basis of the estimated rise-in-reverberation time point T0 in Step 150.

In a case where the reverberation and the reflected wave overlap, the control ECU 4 estimates the rise-in-reverberation time point T0 of the reflected wave on the basis of the fall time point T3. The rise-in-reverberation time point $T_0$ is a time point before the fall time point and after the time point of start of the driving signal. Thus, in the case where the reverberation and the reflected wave overlap, it is possible to detect the distance to the object using the reflected wave.

In this regard, description will be given of a method of calculating the reflection amplitude model R and the rise-in-reverberation time point $T_0$ in Steps 430 and 440. The two sides L1 and L2 defining the reflection amplitude model R are represented by the following expressions according to the condition 3.

Expression of side $L1: y=-a \times (t-T0-TD1)$ (Expression 1)

Expression of side $L2: y=b \times (t-T0)$ (Expression 2)

In the expressions, −a and b represent an inclination of the side L1 and an inclination of the side L, respectively. Moreover, according to the condition 4, $b = a \times T2/T1$ (Expression 3)

is established. In the expressions 1, 2, and 3, unknown amounts are a, b, T0, y, and t and known amounts are T0 and TD1.

On the basis of the expression 1, an intersection between L1 and L2 is represented as follows.

$t = T0 + TD½$ (Expression 4)

$y = a/2 \times TD1$ (Expression 5)

Since the intersection lies on the amplitude prediction curve S according to the condition 2, $b \times (T0+T1-T0) = A \times [\exp\{-m \times c/2 \times (T0+T1)\}]/(T0+T1)^2$ (Expression 6)

is established.

Moreover, since the side L1 passes through the position (T3, X) according to the condition 1, $X = -a \times (T1-T0-TD1)$ (Expression 7).

In the expressions 3, 6, and 7, unknown amounts are a, b, and T0 and the other amounts are known. Thus, it is possible to calculate the rise-in-reverberation time point $T_0$ by solving the expressions 3, 6, and 7 in terms of T0.

Moreover, the control unit 14 causes the microphone 11 to transmit a transmission wave (hereinafter referred to as "past transmission wave") before transmitting the transmission wave that eventually generates the oscillation 64, which is caused by the reflected wave overlapping the reverberation, as described above. The past transmission wave is then reflected from the object, thereby generating the above reflected wave 62. The reflected wave 62 corresponds to a past reflected wave. When the microphone 11 receives the reflected wave 62 and oscillates, the control unit 14 acquires an oscillation signal corresponding to the oscillation of the microphone 11 caused by the reflected wave 62. The oscillation signal corresponds to a past oscillation signal.

The maximum amplitude M and the amplitude maximum time point Tm are then recorded in the control ECU 4, the maximum amplitude M being an amplitude maximum value in a variation with time of an amplitude of the past oscillation signal, the amplitude maximum time point Tm being a time point when the amplitude reaches the maximum value in the variation with time of the amplitude of the past oscillation signal. The maximum amplitude M corresponds to a past maximum amplitude and the amplitude maximum time point Tm corresponds to a past amplitude maximum time point. As is understandable from the above, it is possible to estimate the rise-in-reverberation time point $T_0$ with high accuracy by using information regarding the amplitude of the reflected wave 62 not having overlapped the reverberation in the past.

More specifically, the control unit 14 estimates the rise time point $T_0$ as an earlier time point with an increase in the above coefficient A.

Moreover, the control ECU 4 determines whether the rise-in-reverberation time point $T_0$ is to be calculated on the basis of a location of an object identified at a time point in the past and a displacement of the vehicle from the time point in the past. In other words, the control ECU 4 determines whether the reflected wave overlaps the reverberation on the basis of a location of an object identified at a time point in the past and a displacement of the vehicle from the time point in the past. This makes it possible to determine whether the reflected wave overlaps the reverberation with high accuracy on the basis of a travel history of the vehicle in the past.

Second Embodiment

Figure 9:
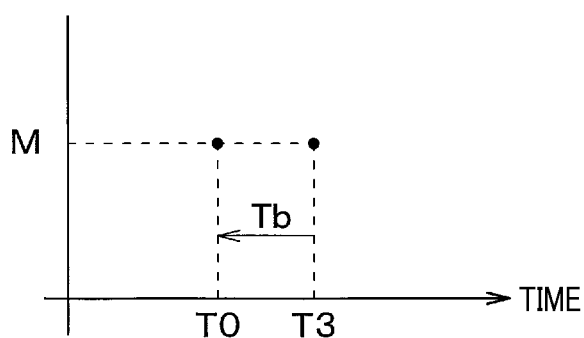
FIG. 9 is a diagram that illustrates a method of calculating an early fall time point according to a second embodiment.

Next, a second embodiment will be described. A vehicle object detector according to the second embodiment is different from the vehicle object detector according to the first embodiment only in a process content in Step 140. Specifically, in Step 140, the control ECU 4 estimates a time point before the early fall time point T3 by a predetermined time Tb as the early fall time point T3 as illustrated in FIG. 9. The predetermined time Tb is a fixed time that is not variable. The predetermined time Tb is set in advance as a time that is substantially as long as a wave width (duration) of the reflected wave overlapping the reverberation. The wave width of the reflected wave is an amount corresponding to a duration of continuation of the reflected wave. The other operations are the same as in the first embodiment.

This reduces a processing load for estimating the rise-in-reverberation time point T0, although an accuracy of estimation of the rise-in-reverberation time point T0 is lower than in the first embodiment.

Regarding the other functions, the vehicle object detector according to the second embodiment is able to provide effects similar to those of the first embodiment.

It should be noted that in the above first and second embodiments, the control unit 14 of the ultrasonic sensor 1 functions as an acquiring unit by performing Step 220 and functions as a fall identifying unit by performing Step 245. In addition, the control ECU 4 functions as a detection information recording unit by performing Step 120, functions as an estimation determining unit by performing Step 130, functions as a rise estimating unit by performing Step 140, and functions as a distance determining unit by performing Step 150.

It should be noted that as the early fall time point T3 is later, the rise-in-reverberation time point $T_0$ is estimated as a later time point in the second embodiment. Moreover, in the calculation method of the rise-in-reverberation time point $T_0$ as in the first embodiment, the rise-in-reverberation time point $T_0$ may also be estimated as a later time point as the early fall time point T3 is later.

Other Embodiments

It should be noted that the disclosure is by no means limited to the above embodiments and may be modified as needed. Moreover, the above embodiments are relevant to each other thus may be combined as needed unless the combination is obviously impossible. Moreover, regarding the above embodiments, elements constituting the embodiments are not necessarily required unless, for example, being explicitly described to be especially required or being considered to be obviously required in principle. Moreover, regarding the above embodiments, if numerical values such as a number, a numerical value, an amount, and a range of components of the embodiments are described, such numerical values are by no means limited to specific values as described unless, for example, being explicitly described to be especially required to be the specific values or being obviously limited to the specific values in principle. In particular, if a plurality of exemplary values of an amount are provided, any intermediate value between the plurality of values may be employed unless a particular description is separately provided or the value is obviously impossible in principle. Moreover, regarding the above embodiments, if a shape, a positional relationship, etc. of a component, etc. are described, the shape, the positional relationship, etc. are not limited to a specific shape, positional relationship, etc. as described unless, for example, being explicitly described or being limited to the specific shape, positional relationship, etc. in principle. Moreover, the disclosure may accept the following modification examples of the above embodiments and any modification example within an equivalent range. It should be noted that each of the following modification examples is independently selectively applicable or inapplicable to the above embodiments. In other words, any combination of the following modification examples is applicable to the above embodiments.

Modification Example 1

The control ECU 4 may determine whether the reverberation and the reflected wave overlap irrespective of the displacement of the vehicle in Step 130. Specifically, the reverberation and the reflected wave are determined not to overlap if the most recent detection information includes the early fall time point T3, and the reverberation and the reflected wave are determined to overlap if the detection information does not include the early fall time point T3.

Modification Example 2

In the first embodiment, the reflection amplitude model R is defined by the two sides of equal length of the isosceles triangle with the base that corresponds to the time axis with zero amplitude in the time-amplitude space. However, such a shape of the reflection amplitude model R is not exhaustive. For example, the reflection amplitude model R may be in the shape of a parabola that opens downward.

Modification Example 3

In the above second embodiment, the predetermined time Tb is the fixed time that is not variable. However, the predetermined time Tb may be a variable time. For example, the predetermined time Tb may be an amount that increases with an increase in the coefficient A described in the first embodiment.

Modification Example 4

In the above embodiments, the single ultrasonic sensor 1 is connected to the control ECU 4. However, a plurality of ultrasonic sensors may be connected to the control ECU 4.

What is claimed is:

1. An object detector comprising:
an acquiring unit configured to acquire an oscillation signal corresponding to an oscillation of a microphone, the microphone being configured to transmit a transmission wave, which is an ultrasonic wave, by being driven to oscillate on a basis of a driving signal, while being caused to oscillate by receiving a reflected wave generated as a result of the transmission wave being reflected from an object;
a fall identifying unit configured to identify, in a variation with time of an amplitude of the oscillation signal acquired by the acquiring unit, a fall time point of a first drop from a value more than a threshold to the threshold or less after termination of the driving signal, the fall time point is a time point when an oscillation caused by a reverberation is the threshold or less;
a rise estimating unit configured to estimate a rise-in-reverberation time point of the reflected wave on a basis of the fall time point identified by the fall identifying unit, the rise-in-reverberation time point being before the fall time point and after a time point of start of the driving signal, when the oscillation caused by the reflected wave solely overlaps the oscillation caused by the reverberation, the rise-in-reverberation time point is a time point when the amplitude of the oscillation signal of the oscillation caused by the reflected wave increases from zero;
a distance determining unit configured to determine a distance to the object on a basis of the rise-in-reverberation time point estimated by the rise estimating unit; and
a detection information recording unit, wherein
when the microphone is caused to oscillate by receiving a past reflected wave generated as a result of a past transmission wave being reflected from the object, the acquiring unit is configured to acquire a past oscillation signal corresponding to an oscillation of the microphone caused by the past reflected wave, the past transmission wave having been transmitted from the microphone before the transmission wave is transmitted, the transmission wave generating the oscillation, which is caused by the reflected wave overlapping the reverberation,
the detection information recording unit is configured to record a past maximum amplitude and a past amplitude maximum time point, the past maximum amplitude being an amplitude maximum value in a variation with time of an amplitude of the past oscillation signal, the past amplitude maximum time point being a time point when the amplitude reaches the maximum value in the variation with time of the amplitude of the past oscillation signal, and the rise estimating unit is configured to:
- determine whether the reverberation and the reflected wave overlap;
- in response to determining that the reverberation and the reflected wave overlap, estimate the rise-in-reverberation time point on a basis of the past maximum amplitude recorded in the detection information recording unit, the past amplitude maximum time point recorded in the detection information recording unit, the threshold, and the fall time point; and
- further estimate a time point earlier than the fall time point by a fixed time as the rise-in-reverberation time point, the fixed time is set in advance as a time that is as long as a wave width of the reflected wave overlapping the reverberation.

2. The object detector according to claim 1, wherein the rise estimating unit is configured to estimate the rise-in-reverberation time point as a later time point as the fall time point is later.

3. The object detector according to claim 1, further comprising an estimation determining unit configured to determine whether the rise estimating unit is to estimate the rise-in-reverberation time point on a basis of a location of an object identified at a time point in a past and a displacement of a vehicle from the time point in the past.

4. The object detector according to claim 1, wherein the rise estimating unit is configured to estimate the rise-in-reverberation time point when the fall time point is after a reference time point, the reference time point is a time point elapsed of a predetermined reverberation time from an output start point of the transmission instruction signal of the transmission wave.

* * * * *